US007882733B2

United States Patent
Isono

(10) Patent No.: US 7,882,733 B2
(45) Date of Patent: Feb. 8, 2011

(54) TIRE-PRESSURE CONTROL APPARATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 461 days.

(21) Appl. No.: 12/092,410

(22) PCT Filed: Sep. 6, 2007

(86) PCT No.: PCT/JP2007/067774

§ 371 (c)(1),
(2), (4) Date: May 2, 2008

(87) PCT Pub. No.: WO2008/081621

PCT Pub. Date: Jul. 10, 2008

(65) Prior Publication Data

US 2010/0170605 A1 Jul. 8, 2010

(30) Foreign Application Priority Data

Dec. 28, 2006 (JP) .............................. 2006-354012

(51) Int. Cl.
*G01M 17/02* (2006.01)
(52) U.S. Cl. ...................... 73/146.8; 152/415; 340/442
(58) Field of Classification Search ................. None
See application file for complete search history.

(56) References Cited

U.S. PATENT DOCUMENTS

| 5,018,797 | A | * | 5/1991 | Takata | ..................... 303/117.1 |
| 5,309,969 | A | * | 5/1994 | Mittal | ......................... 152/415 |
| 5,411,051 | A | * | 5/1995 | Olney et al. | ................... 137/225 |
| 5,413,159 | A | * | 5/1995 | Olney et al. | ................... 152/418 |
| 5,540,268 | A | * | 7/1996 | Mittal | ......................... 152/415 |
| 7,509,969 | B2 | * | 3/2009 | Huang | ......................... 137/226 |

FOREIGN PATENT DOCUMENTS

| CA | 2 579 575 | 10/2006 |
| EP | 0 166 123 | 1/1986 |
| EP | 0 344 002 | 11/1989 |
| EP | 0 601 556 | 6/1994 |
| JP | 2 20409 | 1/1990 |
| JP | 7 137515 | 5/1995 |

* cited by examiner

*Primary Examiner*—Andre J Allen
(74) *Attorney, Agent, or Firm*—Oblon, Spivak, McClelland, Maier & Neustadt, L.L.P.

(57) ABSTRACT

A tire-pressure control apparatus includes an air pump driven by a rotating wheel to supply compressed air to a tire air chamber, a mechanical control valve that permits and prohibits supply of compressed air from the air pump to the tire air chamber, a valve-state detection sensor that detects the state of the control valve, a wheel speed sensor that detects rotational speed of the wheel, and an electric control unit (ECU). The ECU calculates a quantity of compressed air supplied from the air pump to the tire air chamber during a permission-state retention time, during which the control valve is in the permission state, and calculates an average leaked air quantity per unit time in a single cycle starting when the control valve enters a prohibition state and ending when the control valve again enters the prohibition state after entering the permission state.

4 Claims, 6 Drawing Sheets

TIRE-PRESSURE CONTROL APPARATUS

TECHNICAL FIELD

The present invention relates to a tire-pressure control apparatus which includes an air pump which can be driven by a rotating wheel and can supply compressed air to a tire air chamber of the wheel, and a control valve device disposed in an air passageway extending between the air pump and the tire air chamber and adapted to control the tire pressure within the tire air chamber.

BACKGROUND ART

A tire-pressure control apparatus of such a type is disclosed in, for example, Japanese Patent Application Laid-Open (kokai) No. H2-20409.

In the tire-pressure control apparatus disclosed in the above-mentioned publication, pulsed air pressure is applied to a tire air chamber via a control valve device; the air pressure within an air passageway leading to the tire air chamber is continuously measured several times by use of a pressure sensor during an air-pressure stable period; i.e., after the air pressure within the air passageway becomes stable; a change rate of the pressure in the air-pressure stable period is determined; and air leakage is determined on the basis of the measured pressure change rate.

However, in the tire-pressure control apparatus disclosed in the publication, the air pressure within the air passageway must be continuously measured several times by use of a pressure sensor, which increases control load. Further, since the air pressure within the air passageway changes depending on travel conditions of a vehicle and other factors, the tire-pressure control apparatus may erroneously determine that air leakage occurs even when no air leaks.

DISCLOSURE OF THE INVENTION

An object of the present invention is to provide a tire-pressure control apparatus which can detect leakage of air from a pneumatic circuit without use of a pressure sensor.

A tire-pressure control apparatus according to a first aspect of the present invention comprises an air pump which is driven by a rotating wheel so as to supply compressed air to a tire air chamber of the wheel, and a mechanical control valve device disposed in an air passageway extending between the air pump and the tire air chamber and adapted to control a tire pressure within the tire air chamber. During a period over which the tire pressure increases to an upper limit set value from a lower limit set value after having decreased to the lower limit set value, the control valve device is in a permission state where the control valve device permits supply of compressed air from the air pump to the tire air chamber. During a period over which the tire pressure decreases to the lower limit set value from the upper limit set value after having increased to the upper limit set value, the control valve device is in a prohibition state where the control valve device prohibits supply of compressed air from the air pump to the tire air chamber. The tire-pressure control apparatus further comprises a valve state detection sensor for detecting whether the control valve device is in the permission state or the prohibition state; time measurement means for measuring a prohibition-state retention time, which is a time period starting when the control valve device enters the prohibition state and ending when the control valve device enters the permission state and a permission-state retention time, which is a time period starting when the control valve device enters the permission state and ending when the control valve device enters the prohibition state; a wheel speed sensor for detecting rotational speed of the wheel; total-discharged-air-quantity calculation means for calculating a total discharged air quantity, which is a total quantity of compressed air supplied from the air pump to the tire air chamber during the permission-state retention time, from a previously obtained quantity of compressed air discharged from the air pump per single revolution thereof and the rotational speed of the wheel which the wheel speed sensor detects during the permission-state retention time measured by the time measurement means; and average-leaked-air-quantity calculation means for calculating an average leaked air quantity per unit time in a single cycle starting when the control valve device enters the prohibition state and ending when the control valve device again enters the prohibition state after entering the permission state or a single cycle starting when the control valve device enters the permission state and ending when the control valve device again enters the permission state after entering the prohibition state, from the prohibition-state retention time and the permission-state retention time measured by the time measurement means and the total discharged air quantity calculated by the total-discharged-air-quantity calculation means.

The above-described tire-pressure control apparatus according to the present invention is configured in consideration that the total discharged air quantity; i.e., the total quantity of compressed air supplied from the air pump to the tire air chamber during a single cycle starting when the control valve device enters the prohibition state and ending when the control valve device again enters the prohibition state after entering the permission state (or during a single cycle starting when the control valve device enters the permission state and ending when the control valve device again enters the permission state after entering the prohibition state) is equal to the total quantity of compressed air that leaks to the atmosphere from a pneumatic circuit, including the tire air chamber, during the above-mentioned single cycle.

The total discharged air quantity; i.e., the total quantity of compressed air supplied from the air pump to the tire air chamber during the above-described single cycle, is calculated by the total-discharged-air-quantity calculation means from a previously obtained quantity of compressed air discharged from the air pump per single revolution thereof and the rotational speed of the wheel which the wheel speed sensor detects during the permission-state retention time measured by the time measurement means; i.e., a time period starting when the control valve device enters the permission state and ending when the control valve device enters the prohibition state.

An average leaked air quantity per unit time in the above-described single cycle is calculated by the average-leaked-air-quantity calculation means from the prohibition-state retention time measured by the time measurement means; i.e., a time period starting when the control valve device enters the prohibition state and ending when the control valve device enters the permission state, the permission-state retention time in the above-described and the total discharged air quantity calculated by the total-discharged-air-quantity calculation means.

As described above, in the tire-pressure control apparatus according to the present invention, the quantity of air leaking from the pneumatic circuit to the atmosphere (the average leaked air quantity per unit time in a single cycle) is calculated without use of air pressure within the pneumatic circuit which changes depending on travel conditions of a vehicle and other factors (without use of a pressure sensor). Therefore, an anomaly of air leakage at the pneumatic circuit can be determined unerringly on the basis of the leaked air quantity.

A tire-pressure control apparatus according to a second aspect of the present invention comprises an air pump, a mechanical control valve device, a valve state detection sensor, time measurement means, and a wheel speed sensor, which are identical to those of the tire-pressure control apparatus according to the first aspect of the present invention. The tire-pressure control apparatus according to the second aspect comprises average-discharged-air-quantity calculation means for calculating an average discharged air quantity, which is a quantity of compressed air supplied from the air pump to the tire air chamber per unit time during the permission-state retention time, from a previously obtained quantity of compressed air discharged from the air pump per single revolution thereof and the rotational speed of the wheel which the wheel speed sensor detects during the permission-state retention time measured by the time measurement means; and average-leaked-air-quantity calculation means for calculating an average leaked air quantity per unit time from the average discharged air quantity calculated by the average-discharged-air-quantity calculation means and a ratio of the permission-state retention time to a time of a single cycle starting when the control valve device enters the prohibition state and ending when the control valve device again enters the prohibition state after entering the permission state or a single cycle starting when the control valve device enters the permission state and ending when the control valve device again enters the permission state after entering the prohibition state.

The above-described tire-pressure control apparatus according to the present invention is configured in consideration that the total discharged air quantity; i.e., the total quantity of compressed air supplied from the air pump to the tire air chamber during a single cycle starting when the control valve device enters the prohibition state and ending when the control valve device again enters the prohibition state after entering the permission state (or during a single cycle starting when the control valve device enters the permission state and ending when the control valve device again enters the permission state after entering the prohibition state) is equal to the total quantity of compressed air that leaks to the atmosphere from the pneumatic circuit, including the tire air chamber, during the above-mentioned single cycle.

The average discharged air quantity; i.e., the average quantity of compressed air supplied from the air pump to the tire air chamber during the permission-state retention time, is calculated by the average-discharged-air-quantity calculation means from a previously obtained quantity of compressed air discharged from the air pump per single revolution thereof and the rotational speed of the wheel which the wheel speed sensor detects during the permission-state retention time measured by the time measurement means.

An average leaked air quantity per unit time in the above-described single cycle is calculated by the average-leaked-air-quantity calculation means from the average discharged air quantity calculated by the average-discharged-air-quantity calculation means and the ratio of the permission-state retention time to the time of the above-described single cycle.

As described above, in the tire-pressure control apparatus according to the present invention, the quantity of air leaking from the pneumatic circuit to the atmosphere (the average leaked air quantity per unit time in a single cycle) is calculated without use of air pressure within the pneumatic circuit which changes depending on travel conditions of a vehicle and other factors (without use of a pressure sensor). Therefore, an anomaly of air leakage at the pneumatic circuit can be determined unerringly on the basis of the leaked air quantity.

The present invention may be embodied to include leakage-quantity determination means for determining whether or not the average leaked air quantity is greater than a set value; and reporting means for reporting results of determination by the leakage-quantity determination means. In this case, the state (normal or anomalous) of air leakage at the pneumatic circuit can be reported to a driver by the reporting means.

BEST MODE FOR CARRYING OUT THE INVENTION

Figure 1:
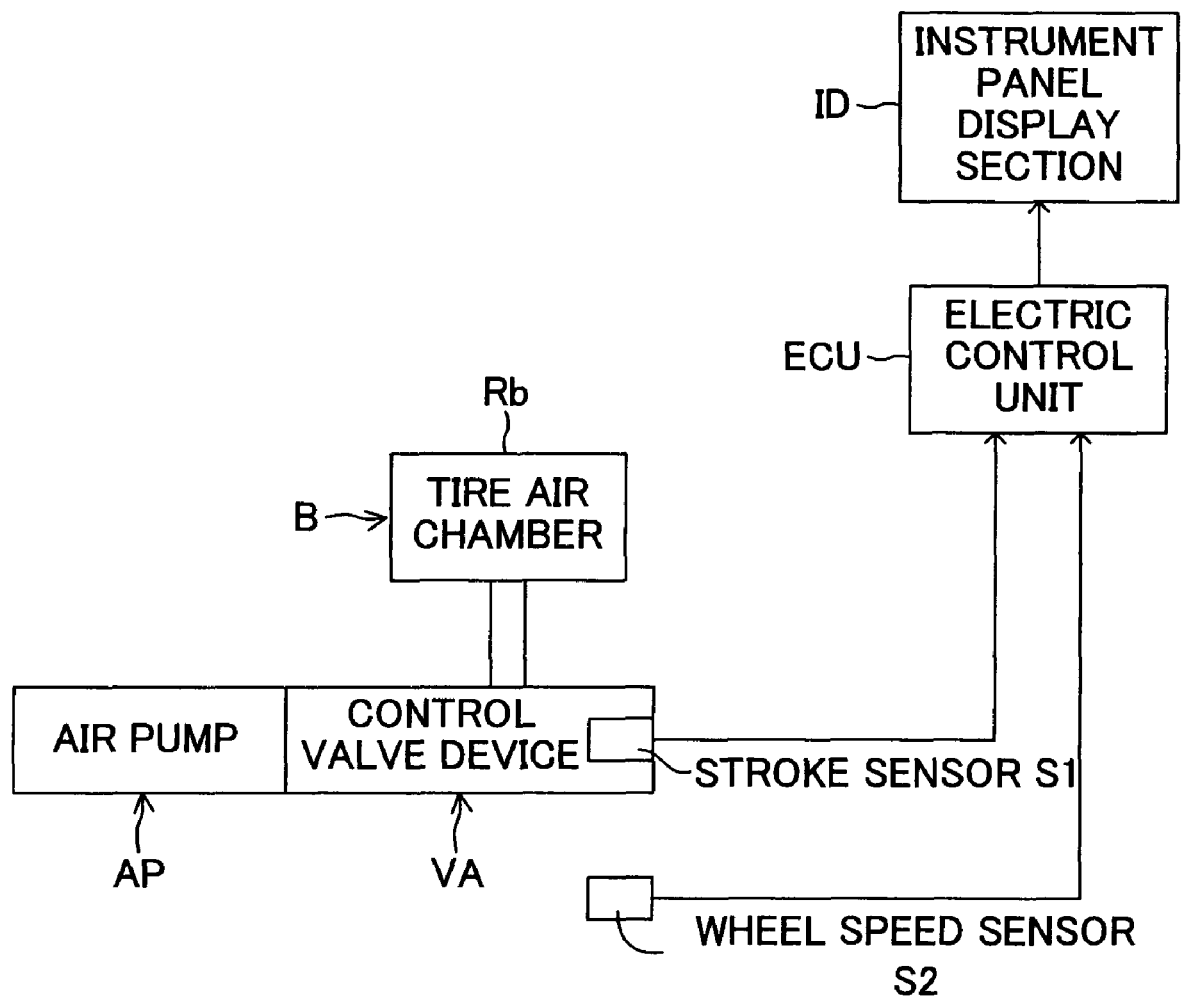
FIG. 1 is a block diagram schematically showing one embodiment of a tire-pressure control apparatus according to the present invention.

An embodiment of the present invention will next be described with reference to the drawings. FIG. 1 schematically shows a tire-pressure control apparatus according to the present invention. This tire-pressure control apparatus includes an air pump AP capable of supplying compressed air to a tire air chamber Rb (formed by a wheel body B1 and a tire B2 shown in FIG. 2) of a wheel B via a control valve device VA.

Figure 2:
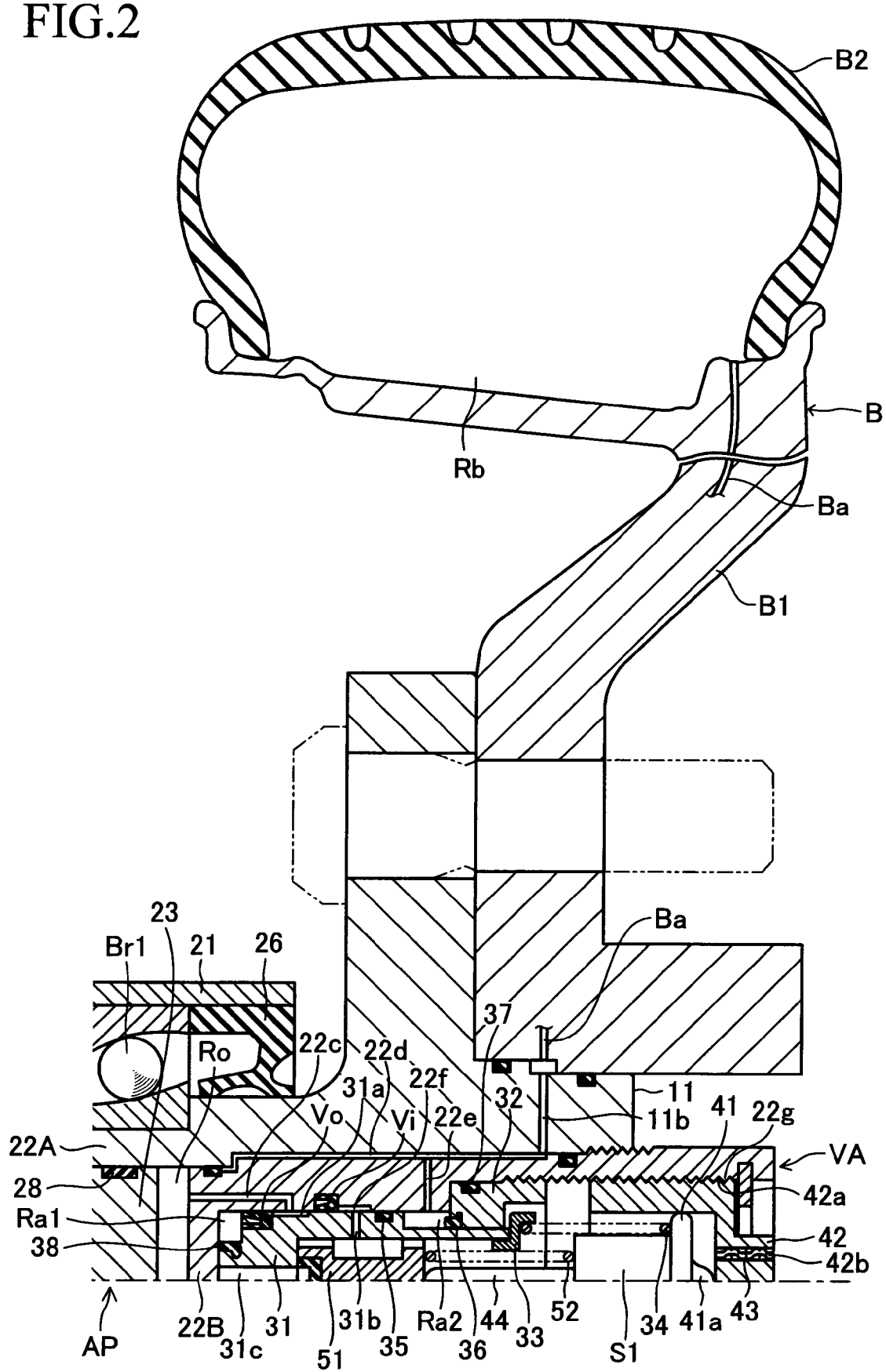
FIG. 2 is a detailed vertical sectional view shoring portions of a tire air chamber, an air pump, and a control valve device shown in FIG. 1.
Figure 3:
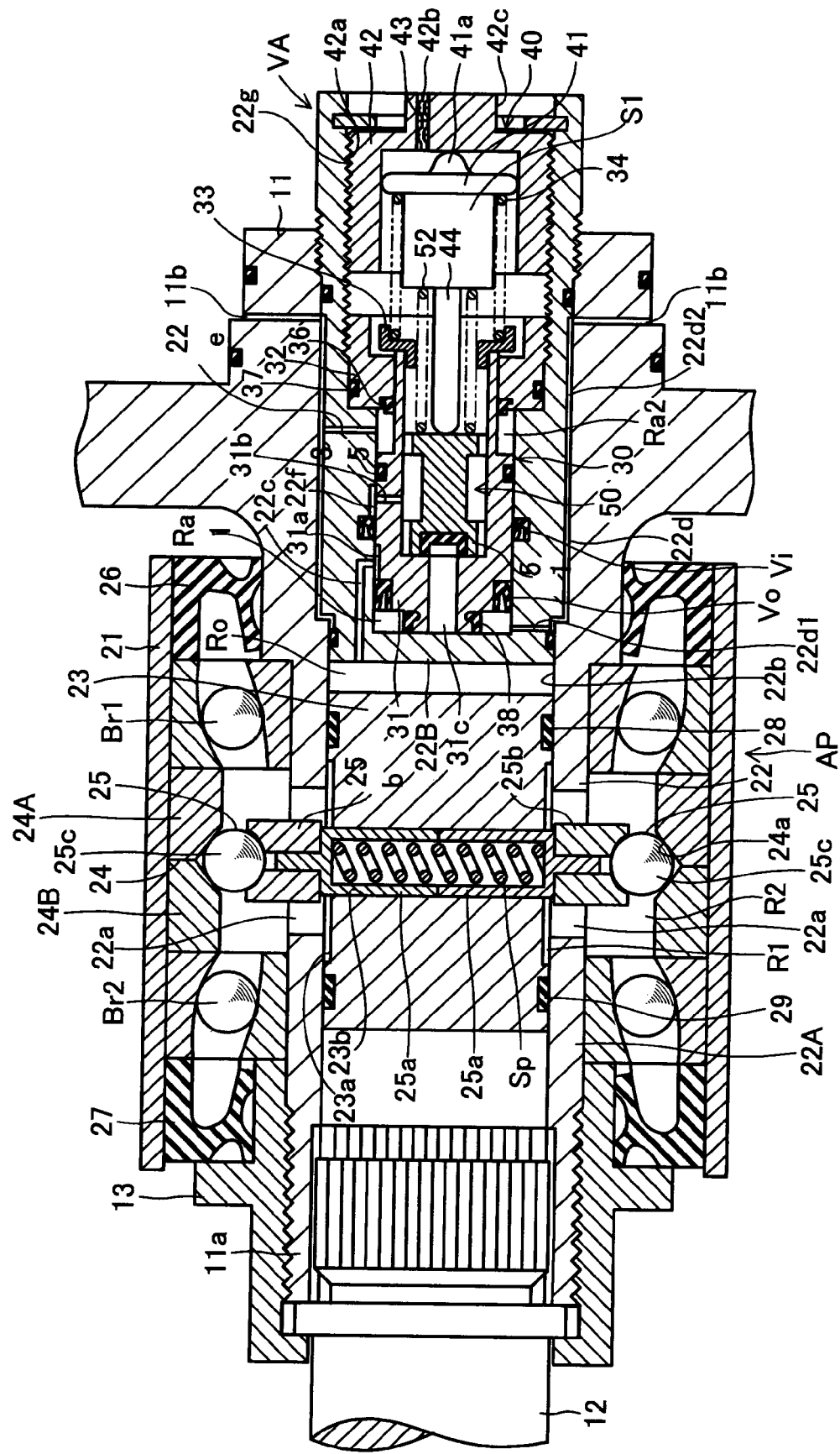
FIG. 3 is a sectional view of the air pump and the control valve device shown in FIGS. 1 and 2.

As shown in FIGS. 2 and 3 in detail, the air pump AP and the control valve device VA are attached to an axle hub 11 which rotates with the wheel B. A driving axle 12 is splined to the inboard end of the axle hub 11, whereby the axle hub 11 and the driving axle 12 are connected for torque transmission. The connection between the axle hub 11 and the driving axle 12 is ensured by means of a lock nut 13.

The air pump AP (may be referred to as an air compressor) generates compressed air through adiabatic compression of atmospheric air. The air pump AP is driven as the wheel B rotates, and is stopped as the wheel B stops. The air pump AP can supply compressed air generated according to the rotation of the wheel B, to the tire air chamber Rb of the wheel B via a pressure control valve 30. The air pump AP includes a nonrotatable cylindrical member 21, a rotatable cylinder 22 formed on a shaft portion 11a of the axle hub 11, a piston 23 which can reciprocate, a cam member 24, and a pair of cam followers 25.

The cylindrical member 21 is supported nonrotatably by a support member (not shown). The cylinder 22 is supported in the interior of the cylindrical member 21 rotatably about the axis of the wheel B and liquid-tightly via a pair of bearings Br1 and Br2 and a pair of annular seal members 26 and 27. The paired bearings Br1 and Br2 are spaced a predetermined distance apart from each other in the axial direction and intervene between the cylindrical member 21 and the cylinder 22 while sandwiching the cam member 24 therebetween in the axial direction, thereby enabling rotation of the cylinder 22 in relation to the cylindrical member 21. The paired annular seal members 26 and 27 are spaced a predetermined distance apart from each other in the axial direction and intervene between the cylindrical member 21 and the cylinder 22 while sandwiching the cam member 24 and the bearings Br1 and Br2 therebetween in the axial direction, thereby providing a liquid-tight seal between the cylindrical member 21 and the cylinder 22.

The cylinder 22 includes a cylinder body 22A and a cylinder head 22B, which is airtightly and removably screw-engaged with the outboard end portion of the cylinder body 22A. The cylinder body 22A is integrally formed on the shaft portion 11a of the axle hub 11, and includes a pair of axially elongated holes 22a and a cylinder bore 22b extending in the axial direction of the cylinder 22. The cylinder head 22B is a closed-bottomed tubular stopper member airtightly and removably attached to the axle hub 11, and includes a suction-discharge path 22c, a discharge path 22d, a pressure introduction path 22e, and a suction path 22f.

The paired axially elongated holes 22a collectively serve as a guide means for guiding the piston 23 and the cam followers 25 in such a manner that these members are rotatable unitarily with the cylinder 22 and can reciprocate in the axial direction of the piston 23. The paired axially elongated holes 22a are spaced 180 degrees apart from each other in the circumferential direction of the cylinder 22. The cylinder bore 22b accommodates the piston 23. The outboard end portion of the cylinder bore 22b is blocked by the cylinder head 22B. The cylinder bore 22b, in cooperation with the cylinder head 22B and the piston 23, forms a pump chamber Ro.

The suction-discharge path 22c always communicates with a communication path 31a provided in a valve body 31 of the pressure control valve 30. The suction-discharge path 22c can lead air into the pump chamber Ro through a suction check valve Vi (formed by an annular seal member having a V-shaped cross section) attached to the cylinder head 22B, and can lead air from the pump chamber Ro through a discharge check valve Vo (formed by an annular seal member having a V-shaped cross section) attached to the valve body 31 of the pressure control valve 30.

The discharge path 22d leads compressed air discharged into an air chamber Ra1 via the discharge check valve Vo, into a discharge path 11b provided in the axle hub 11. The discharge path 22d includes a communication hole 22d1 provided in the cylinder head 22B and extending in a radial direction thereof and a communication groove 22d2 provided on the outer circumference of the cylinder head 22B. As shown in FIG. 2, the discharge path 11b provided in the axle hub 11 communicates with the tire air chamber Rb through a communication path Ba provided in the wheel B.

The pressure introduction path 22e is a communication hole provided in the cylinder head 22B and extending in a radial direction of the cylinder head. The pressure introduction path 22e is adapted to introduce the pressure of compressed air in the discharge path 22d into an air chamber Ra2 formed between the valve body 31 of the pressure control valve 30 and a stopper 32. The suction path 22f always communicates with an atmosphere communication path 31b provided in the valve body 31 of the pressure control valve 30. The communication between the suction path 22f and the communication path 31a provided in the valve body 31 of the pressure control valve 30 can be established and cut off. The atmosphere communication path 31b provided in the valve body 31 always communicates with the atmosphere through an atmosphere communication path 42b formed in an adjusting screw 42 of a regulator 40.

The piston 23 is inserted into the cylinder bore 22b of the cylinder 22 via a pair of annular seal members 28 and 29 and is attached to the cylinder 22 in a unitarily rotatable manner and in such a manner as to be able to axially reciprocate. The piston 23 has an annular groove 23a and a through hole 23b extending in a radial direction thereof. The paired annular seal members 28 and 29 are spaced a predetermined distance apart from each other in the axial direction of the piston 23 and intervene between the piston 23 and the cylinder 22 at respective, axial end portions of the piston 23, thereby providing an airtight, liquid-tight seal between the piston 23 and the cylinder 22.

The annular groove 23a is formed on the outer circumference of the piston 23 between the paired annular seal members 28 and 29, whereby an annular space R1 is formed between the piston 23 and the cylinder 22. The annular space R1 communicates with an annular space R2 formed between the paired annular seal members 26 and 27, through the axially elongated holes 22a formed in the cylinder 22. The annular spaces R1 and R2 remain unchanged in volume during axial reciprocating motion of the piston 23 and are sealed by means of the four seal members 26, 27, 28, and 29. The annular spaces R1 and R2 and the like collectively serve as an oil chamber for accommodating a predetermined amount of lubrication oil. This oil chamber accommodates the bearings Br1 and Br2, the cam member 24, the cam followers 25, a compression coil spring Sp, and the like.

The cam member 24 consists of a pair of cam sleeves 24A and 24B, which are provided in contact with each other in the axial direction of the piston 23, and is attached unitarily (in an axially immovable manner and in a nonrotatable manner) to the cylindrical member 21. The cam member 24 is disposed coaxially with the cylinder 22. The cam member 24 has an annular cam portion 24a whose axial position varies. The cam portion 24a is a cam groove, into which a ball 25c of each cam follower 25 is fitted. The cam portion 24a has a cam face which receives a load along the axial direction of the piston (a load along the horizontal direction in FIG. 3) and a load along the radial direction of the piston (a load along the vertical direction in FIG. 3) from the ball 25c of the cam follower 25. This cam face has a V-shaped cross section and has an even number of geometric cycles (e.g., two geometric cycles) along the circumferential direction of the cylinder 22.

The cam followers 25 each include a shaft 25a divided into two pieces within the piston 23, and a roller 25b and the ball 25c attached to the shaft 25a. The shaft 25a of each of the followers 25 is installed in the through hole 23b of the piston 23 in such a manner as to be movable in a radial direction of the piston 23. The cam followers 25 each are engaged with the cam portion (cam groove) 24a of the cam member 24, at the end portion extending in the piston radial direction (that is, at the ball 25c). Through relative rotation in relation to the cam member 24, the cam followers 25 can move in the axial direction of the piston 23.

The shafts 25a each serve as a load transmission element, which is installed in the through hole 23b of the piston 23 in such a manner as to be movable in the radial direction of the piston 23 (the axial direction of the through hole 23b). The compression coil spring Sp is installed within the shafts 25a and applies force to the shafts 25a in a radially outward direction of the piston 23. The shafts 25a are support bodies which rotatably support the rollers 25b. The rollers 25b are rotatably supported at respective small-diameter end portions projecting from the through hole 23b of the piston 23.

While being rotatably fitted to the respective small-diameter end portions of the shafts 25a, the rollers 25b are rollably fitted into the respective axially elongated holes 22a of the cylinder 22. The rollers 25b can roll along the respective axially elongated holes 22a of the cylinder 22 in association with the axial movement of the cam followers 25. Each of the rollers 25b has a hemispherically recessed bearing portion at its axially outer end. The bearing portions of the rollers 25b rollably support the respective balls 25c.

Each of the balls 25c is a protruded portion of the cam follower 25, which is rollably supported by the roller 25b and is rollably engaged with the cam portion (cam groove) 24a of the cam member 24. Each of the balls 25c is subject to repulsion force of the compression coil spring Sp via the shaft 25a and the roller 25b, and is resiliently engaged with the cam portion (cam groove) 24a of the cam member 24 without clearance.

The compression coil spring Sp is a pressing means for pressing the balls 25c of the cam followers 25 in a radial direction of the piston 23 toward the cam portion (cam groove) 24a of the cam member 24. The compression coil spring Sp is installed in closed-bottomed mounting holes of the shafts 25a of the cam followers 25 under predetermined preload.

In the thus-configured air pump AP, when the cylinder 22 (the axle hub 11) rotates with the valve body 31 of the pressure control valve 30 maintained in the position shown in FIGS. 2 and 3, the piston 23 and the cam followers 25 rotate unitarily with the cylinder 22 and undergo relative rotation in relation to the cam member 24 to thereby move axially. Accordingly, the rotary motion of the cylinder 22 can be converted to the reciprocating motion of the piston 23. The reciprocating motion of the piston 23 can increase and decrease the volume of the pump chamber Ro. Thus, air can be introduced into the pump chamber Ro through the atmosphere communication path 31b which always communicates with the atmosphere, the suction path 22f, the suction check valve Vi, the communication path 31a, and the suction-discharge path 22c. Also air can be discharged from the pump chamber Ro through the suction-discharge path 22c, the communication path 31a, and the discharge check valve Vo (that is, compressed air to be supplied into the tire air chamber Rb can be generated).

The control valve device VA is a mechanical control valve which is disposed in an air passageway between the air pump AP and the tire air chamber Rb, as shown in FIG. 2, and which operates in accordance with the tire pressure; i.e., the air pressure within the tire air chamber Rb, and includes the pressure control valve 30, the regulator 40, and a relief valve 50 which is coaxially disposed within the pressure control valve 30. The control valve device VA and the air pump AP are coaxially disposed in the shaft portion (rotational shaft) 11a of the axle hub 11.

The pressure control valve 30 is installed into the cylinder head 22B and includes the valve body 31, the stopper 32, and a compression coil spring 34. The compression coil spring 34 is engaged with the valve body 31 via a spring retainer 33 and can control moving timing and moving position of the valve body 31. Urging force (spring force) of the compression coil spring 34 which is applied to the valve body 31 can be adjusted by the regulator 40. When the air pressure (P) of the tire air chamber Rb has decreased to a lower limit set value P1, the pressure control valve 30 changes its state from an operation state (a state where the valve body 31 has moved from the position shown in FIGS. 2 and 3 against urging forces of the compression spring 34 and a compression spring 52 by a predetermined distance) to a state shown in FIGS. 2 and 3, whereby compressed air can be supplied from the pump chamber Ro to the tire air chamber Rb. When the pressure of the compressed air supplied from the pump chamber Ro to the tire air chamber Rb increases to an upper limit set value P2 (P1<P2), the pressure control valve 30 changes its state from the state shown in FIGS. 2 and 3 to the operation state, whereby the compressed air supplied from the pump chamber Ro to the tire air chamber Rb can be restricted (stopped).

The valve body 31 is airtightly installed in the cylinder head 22B via the discharge check valve Vo and an annular seal member 35, both attached to the outer circumference of the valve body, in such a manner as to be movable in the axial direction of the cylinder 22. The air chamber Ra1 which communicates with the discharge path 22d is formed between the valve body 31 and the cylinder head 22B. The air chamber Ra2 which communicates with the discharge path 22d via the pressure introduction path 22e is formed between the valve body 31 and the stopper 32. An annular seal member 36 is attached to the inner circumference of the stopper 32, and an annular seal member 37 is attached to the outer circumference of the stopper 32. The stopper 32 is airtightly interposed between the cylinder head 22B and the valve body 31 and is integrally screw-engaged with the cylinder head 22B at the outboard end portion of the outer circumference thereof.

The air chamber Ra1 always communicates with the tire air chamber Rb via the discharge path 22d, the discharge path 11b, and the communication path Ba. The air chamber Ra2 always communicates with the tire air chamber Rb via the pressure introduction path 22e, the discharge path 22d, the discharge path 11b, and the communication path Ba. A pressure-receiving area of the valve body 31 exposed to the air chamber Ra1 is set to be larger than that of the valve body 31 exposed to the air chamber Ra2 by a predetermined area.

In the pressure control valve 30, until the air pressure (P) of the tire air chamber Rb increases to the upper limit set value P2 from the lower limit set value P1 to which the pressure has dropped, the valve body 31 is maintained at the position shown in FIGS. 2 and 3, and the communication between the communication path 31a and the suction path 22f is cut off by the suction check valve Vi. Thus, in the illustrated state, while the suction check valve Vi permits air flow from the atmosphere into the pump chamber Ro and the discharge check valve Vo permits air flow from the pump chamber Ro into the tire air chamber Rb, the suction check valve Vi cuts off the communication between the communication path 31a and the suction path 22f to thereby restrict air flow from the pump chamber Ro to the atmosphere, and the discharge check valve Vo restricts air flow from the tire air chamber Rb to the pump chamber Ro. Therefore, in the above-described state (a permission state where the pressure control valve 30 permits compressed air to be supplied from the air pump AP to the tire air chamber Rb), the reciprocation of the piston 23 associated with the rotation of the wheel B causes atmospheric air to be introduced into the pump chamber Ro and compressed air to be discharged from the pump chamber Ro to the tire air chamber Rb.

In the pressure control valve 30, during a period in which the air pressure (P) of the tire air chamber Rb decreases to the lower limit set value P1 from the upper limit set value P2 to which the pressure has increased, the valve body 31 maintains its axial position shifted from the illustrated position by a predetermined amount, against the urging forces of the compression coil springs 34 and 52, so that the communication path 31a communicates with the suction path 22f irrespective of the presence of the suction check valve Vi. Therefore, the suction check valve Vi has lost its function (reverse-flow prevention function), whereby the communication path 31a communicates with the suction path 22f to thereby permit the air flow between the pump chamber Ro and the atmosphere. Furthermore, the discharge check valve Vo restricts air flow between the discharge path 22d and the communication path 31a; that is, between the pump chamber Ro and the tire air chamber Rb. In a state (an operation state) where the valve body 31 maintains its axial position shifted from the illustrated position by a predetermined amount against the urging forces of the compression coil springs 34 and 52, the shoulder portion of the valve body 31 is in contact with the annular seal member 36 attached to the inner circumference of the stopper 32. Thus, in this state (a prohibition state where the pressure control valve 30 prohibits the supply of compressed air from the air pump AP to the tire air chamber Rb), even when the piston 23 reciprocates as a result of rotation of the wheel B, air once introduced into the pump chamber Ro is pushed back to the atmosphere. Thus, no compressed air is discharged from the pump chamber Ro to the tire air chamber Rb.

The regulator 40 includes a spring support 41 which supports the other end portion (a fixed end portion which does not move even when the valve body 31 moves) of the compression coil spring 34 of the pressure control valve 30; and the adjusting screw 42, which can adjust the position of the spring support 41. The spring support 41 can move as the adjusting screw 42 moves. A hemispherically protruded portion 41a of the spring support 41 is rotatably engaged with the adjusting screw 42.

The adjusting screw 42 is a separate member from the spring support 41, and includes a male thread portion 42a and the atmosphere communication path 42b. The male thread portion 42a of the adjusting screw 42 is screw-engaged with a female screw portion 22g of the cylinder head 22B in such a manner as to be able to advance and retreat. The adjusting screw 42 also serves as a cap, and can be rotated from the outside of the vehicle for adjustment. A hexagonal head portion 42c is formed on the outer end portion of the adjusting screw 42 such that a manually operable adjusting tool (not shown) can be removably attached thereto. A filter 43 is disposed in the atmosphere communication path 42b.

The relief valve 50 is adapted to release compressed air to the atmosphere when the pressure of compressed air supplied from the pump chamber Ro to the tire air chamber Rb; that is, the air pressure (P) within the air chamber Ra1, is equal to or higher than a relief pressure P3 which is higher than the upper limit set value P2. The relief valve 50 includes a valve body 51 which can open and close a relief path 31c provided in the valve body 31; and the compression coil spring 52 whose one end portion (a movable end portion) is engaged with the valve body 51 and which determines the timing at which the valve body 51 moves (i.e., the timing at which the relief path 31c is opened).

The valve body 51 is installed in the valve body 31 of the pressure control valve 30 in such a manner as to be movable in the axial direction of the cylinder 22. The valve body 51 is in contact with a rod portion 44 of the stroke sensor S1 (the rod portion can undergo relative movement in the axial direction of the cylinder 22 with very little resistance when the position of the spring support 41 is adjusted by means of the adjusting screw 42). The other end portion (fixed end portion) of the compression coil spring 52 is engaged with the above-described spring support 41. The urging force of the compression coil spring 52 which acts on the valve body 51 can be adjusted by means of the regulator 40. At the time of adjustment by means of the regulator 40, the urging force of the compression coil spring 34 which acts on the valve body 31 of the pressure control valve 30 is also adjusted. Thus, the above-described upper limit set value P2 and relief pressure P3 can be adjusted simultaneously.

In the relief valve 50, the communication of the relief path 31c provided in the valve body 31 of the pressure control valve 30 with the air chamber Ra1 can be established and cut off by means of an annular seal member 38 attached to the valve body 31. Thus, only when the valve body 31 of the pressure control valve 30 moves against the urging force of the compression coil springs 34 and 52 and then the air chamber Ra1 communicates with the relief path 31c irrespective of presence of the seal member 38, the pressure within the air chamber Ra1 is introduced into the relief path 31c, whereby the relief valve 50 operates.

The stroke sensor S1 is a valve-state detection sensor for detecting whether the pressure control valve 30 is in a permission state (illustrated state) or a prohibition state (operation state). The stroke sensor S1 includes the rod portion 44 which detects movement of the valve body 31 of the pressure control valve 30 via the valve body 51 of the relief valve 50; and an internal switch (not shown) which is provided in the spring support 41 and is turned ON and OFF by the rod portion 44.

In the stroke sensor S1, when the pressure control valve 30 is in the permission state, the internal switch is maintained in the OFF state, and outputs a Low signal; and when the pressure control valve 30 is in the prohibition state, the internal switch is maintained in the ON state, and outputs a High signal. The signal output from the stroke sensor S1 is input by radio into the electric control unit ECU shown in FIG. 1.

As shown in FIG. 1, the electric control unit ECU can receive an output of the stroke sensor S1 and an output of a wheel speed sensor S2, which can detect rotational speed of the wheel B. Further, the electric control unit ECU is electrically connected to an instrument panel display section ID which can display messages "Air Leakage: Normal" and "Air Leakage: Anomalous" for the pneumatic circuit including the tire air chamber Rb.

Figure 4:
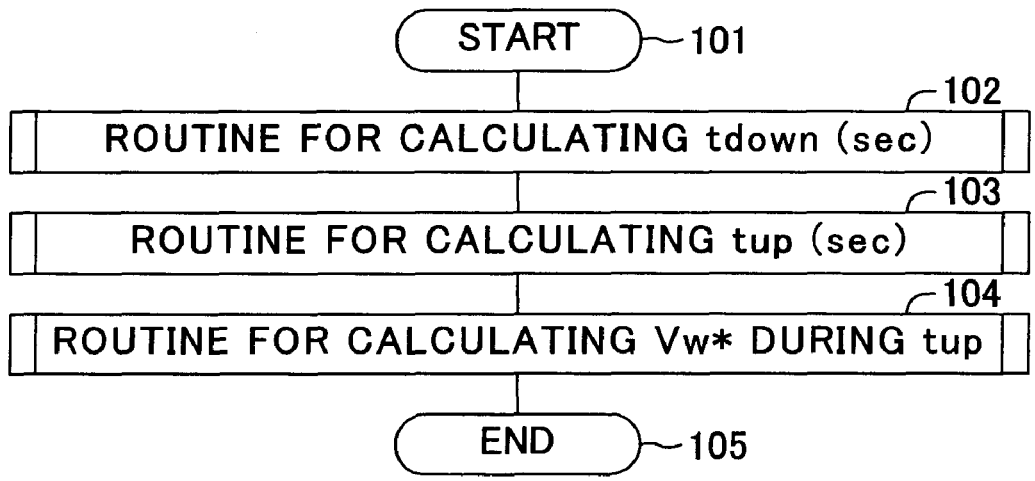
FIG. 4 is a flowchart showing a portion of a program which is executed by a microcomputer of an electric control unit shown in FIG. 1.
Figure 5:
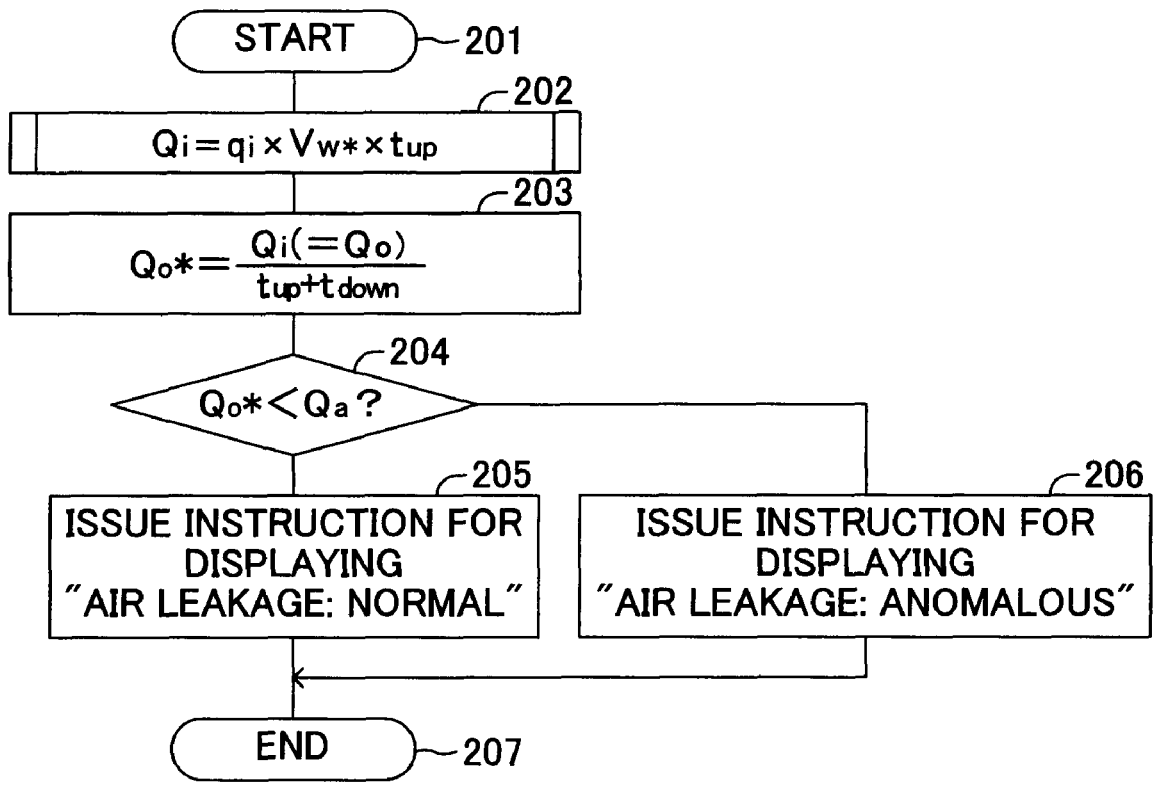
FIG. 5 is a flowchart showing another portion of the program which is executed by the microcomputer of FIG. 1.

Further, the electric control unit ECU includes a microcomputer which performs, at predetermined intervals (e.g., 5 msec), a program corresponding to a flowchart of FIG. 4 (see Steps 101 to 105 of FIG. 4) and a program corresponding to a flowchart of FIG. 5 (see Steps 201 to 207 of FIG. 5), on the basis of the outputs of the stroke sensor S1 and the wheel speed sensor S2.

The microcomputer of the electric control unit ECU performs the program corresponding to the flowchart of FIG. 4 at predetermined intervals so as to measure (calculate) a prohibition-state retention time tdown (sec), which is a time period between a point in time at which the pressure control valve 30 enters the prohibition state (see, for example, time t1 in FIG. 6) and a point in time at which the pressure control valve 30 enters the permission state (see time t2 in FIG. 6), on the basis of the output (ON and OFF states of the internal switch) of the stroke sensor S1 (a routine in Step 102 for calculating tdown); measure (calculate) a permission-state retention time tup (sec), which is a time period between a point in time at which the pressure control valve 30 enters the permission state (see time t2 in FIG. 6) and a point in time at which the pressure control valve 30 enters the prohibition state (see time t3 in FIG. 6), on the basis of the output (ON and OFF states of the internal switch) of the stroke sensor S1 (a routine in Step 103 for calculating tup); and measure (through addition and averaging calculation) average rotational speed Vw* (revolutions/sec) of the wheel B during the permission-state retention time tup (sec) on the basis of the output of the wheel speed sensor S2 (a routine in Step 104 for calculating Vw* during tup).

Figure 6:
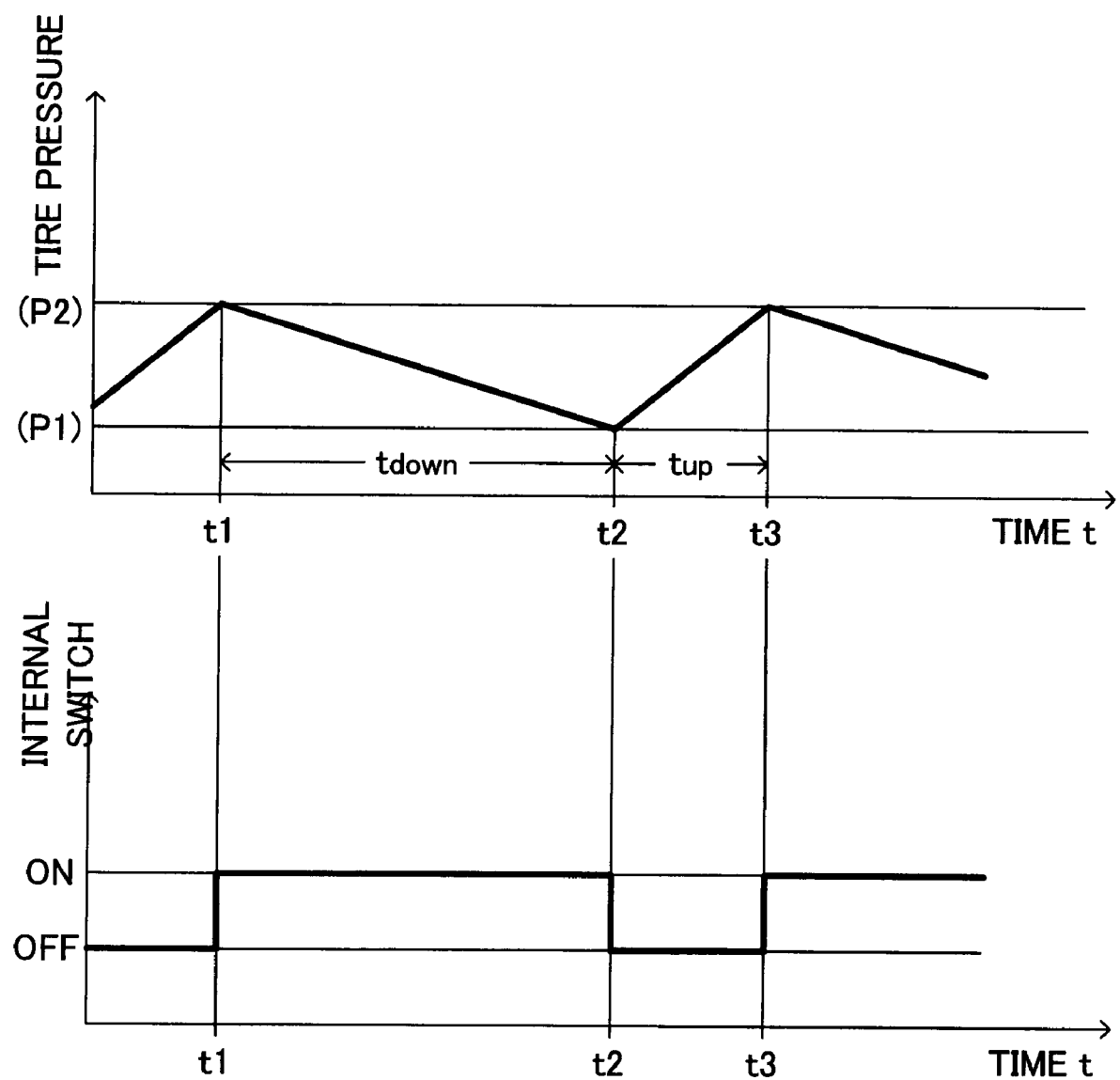
FIG. 6 is a time chart showing the relation among tire pressure, time, and the internal switch of a stroke sensor in the embodiment shown in FIGS. 1 to 5.

The microcomputer of the electric control unit ECU performs the program corresponding to the flowchart of FIG. 5 at predetermined intervals so as to calculate a total discharged air quantity Qi (g), which is the total quantity of compressed air supplied from the air pump AP to the tire air chamber Rb during a single cycle, for example, between time t1 and time t3 of FIG. 6 (specifically, a time period between time t2 and time t3 of FIG. 6) through multiplication of a previously obtained quantity qi (g/revolution) of compressed air discharged from the air pump AP per single revolution thereof and the above-described average rotational speed Vw* (revolutions/sec) and permission-state retention time tup (sec) (calculation in Step 202).

The total discharged air quantity Qi (g); i.e., the total quantity of compressed air supplied from the air pump AP to the tire air chamber Rb during the above-described single cycle, is equal to a total leaked air quantity Qo (g), which is the total quantity of compressed air that leaks to the atmosphere from the pneumatic circuit, including the tire air chamber, during the single cycle. Therefore, the microcomputer of the electric control unit ECU can calculate an average leaked air quantity per unit time Qo* (g/sec) in the single cycle between time t1 and time t3 of FIG. 6 by dividing the above-described total discharged air quantity Qi (g) by the sum of the permission-state retention time tup (sec) and the prohibition-state retention time tdown (sec) (Qi/(tup+tdown)) (calculation in Step 203).

The microcomputer of the electric control unit ECU determines in Step 204 whether or not the average leaked air quantity Qo* is less than a set quantity Qa. When the microcomputer makes a "Yes" determination, it executes Step 207 after execution of Step 205. When the microcomputer makes a "No" determination, it executes Step 207 after execution of Step 204. In Step 205, the microcomputer issues an instruction for displaying a message "Air Leakage: Normal," whereby the message "Air Leakage: Normal" is displayed on the instrument panel display section ID. In Step 206, the microcomputer issues an instruction for displaying a message "Air Leakage: Anomalous," whereby the message "Air Leakage: Anomalous" is displayed on the instrument panel display section ID. Thus, a driver can be informed of the state (normal/anomalous) of air leakage from the pneumatic circuit including the tire air chamber Rb.

In the embodiment configured as described above, the total discharged air quantity Qi (g); i.e., the total quantity of compressed air supplied from the air pump AP to the tire air chamber Rb during the above-described single cycle, is calculated through multiplication of the previously obtained quantity qi (g/revolution) of compressed air discharged from the air pump AP per single revolution thereof, the permission-state retention time tup (sec) (i.e., a time period starting when the pressure control valve 30 enters the permission state and ending when the pressure control valve 30 enters the prohibition state) measured by the microcomputer of the electric control unit ECU (which serves as time measurement means), and the average rotational speed Vw* (revolutions/sec) of the wheel B during the permission-state retention time tup (sec) (see Step 202 of FIG. 5).

Further, the average leaked air quantity per unit time Qo* (g/sec) in the above-described single cycle is calculated by dividing the total discharged air quantity Qi (g) calculated in Step 202 of FIG. 5 by the sum of the prohibition-state retention time tdown (sec) (i.e., a time period starting when the pressure control valve 30 enters the prohibition state and ending when the pressure control valve 30 enters the permission state) and the above-described permission-state retention time tup (sec), both of which are measured by the microcomputer of the electric control unit ECU (see Step 203 of FIG. 5).

As described above, in the embodiment configured as described above, the quantity of air leaking from the pneumatic circuit to the atmosphere (the average leaked air quantity per unit time Qo* in a single cycle) is calculated without use of air pressure within the pneumatic circuit which changes depending on travel conditions of a vehicle and other factors (without use of a pressure sensor). Therefore, an anomaly of air leakage at the pneumatic circuit can be determined unerringly on the basis of the average leaked air quantity Qo*.

The above-described embodiment is configured to determine in Step 204 whether or not the average leaked air quantity Qo* (g/sec) is less than the set quantity Qa and execute Step 205 or 206 on the basis of the results of the determination. Therefore, it is possible to inform the driver of the state (normal/anomalous) of air leakage from the pneumatic circuit through display at the instrument panel display section ID.

In the above-described embodiment, the microcomputer of the electric control unit ECU calculates the permission-state retention time tup (sec) in Step 103 of FIG. 4, calculates the average rotational speed Vw* (revolutions/sec) in Step 104, and calculates the total discharged air quantity Qi (g) through multiplication of the discharged air quantity qi (g/revolution), the average rotational speed Vw* (revolutions/sec), and the permission-state retention time tup (sec) in Step 202 of FIG. 5. However, the embodiment may be modified to calculate a total number of revolutions of the wheel during the permission-state retention time tup (sec) in a step corresponding to Step 104, and calculate the total discharged air quantity Qi (g) through multiplication of the total number of revolutions of the wheel and the discharged air quantity qi (g/revolution) in a step corresponding to Step 202. Notably, the total number of revolutions of the wheel can also be calculated through, for example, accumulation (addition) of the number of revolutions of the wheel obtained through multiplication of the rotational speed Vw (revolutions/sec) which the wheel speed sensor S2 detects every time a set time elapses during the permission-state retention time tup (sec), and the set time.

In the above-described embodiment, the microcomputer of the electric control unit ECU is configured to execute the programs corresponding to the flowcharts of FIGS. 4 and 5 at predetermined intervals. However, the microcomputer of the electric control unit ECU may be configured to execute the program corresponding to the flowchart of FIG. 4 and a program corresponding to a flowchart of FIG. 7 at predetermined intervals.

Figure 7:
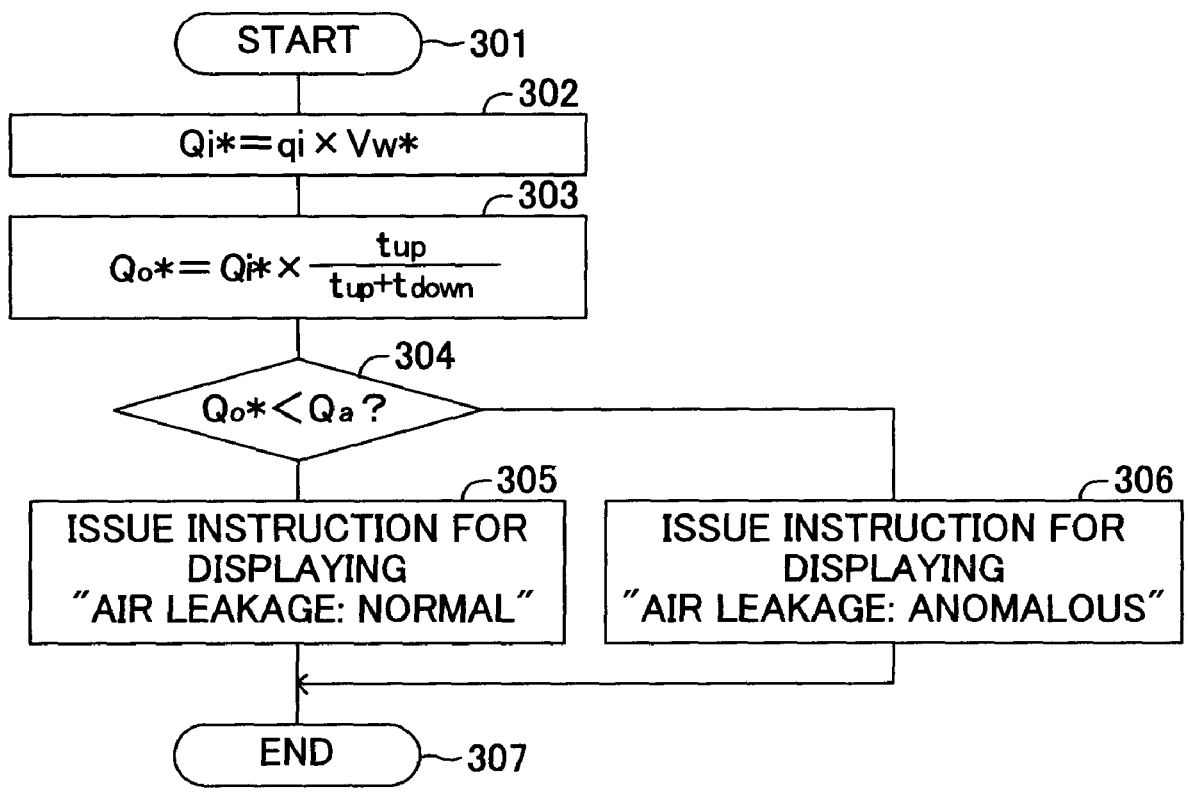
FIG. 7 is a flowchart which corresponds to that of FIG. 5 and which is executed by a microcomputer of an electric control unit in another embodiment of the tire-pressure control apparatus according to the present invention.

In this case (second embodiment), the microcomputer of the electric control unit ECU performs the program corresponding to the flowchart of FIG. 7 at predetermined intervals so as to calculate an average discharged air quantity Qi* (g/sec), which is the average quantity of compressed air supplied from the air pump AP to the tire air chamber Rb during the permission-state retention time tup (sec), for example, between time t2 and time t3 of FIG. 6 through multiplication of the previously obtained quantity qi (g/revolution) of compressed air discharged from the air pump AP per single revolution thereof and the average rotational speed Vw* (revolutions/sec) calculated in Step 104 of FIG. 4 (calculation in Step 302).

The microcomputer of the electric control unit ECU calculates the average leaked air quantity per unit time Qo* (g/sec) in a single cycle, for example, between time t1 and time t3 of FIG. 6 on the basis of the above-described average discharged air quantity Qi* (g/sec) and the ratio of the permission-state retention time tup (sec) to the time of the single cycle including the permission-state retention time tup (sec) and the prohibition-state retention time tdown (sec) (duty ratio tup/(tup+tdown)) (calculation in Step 303).

Since the processings performed in the steps of FIG. 7 other than Steps 302 and 303; i.e., the processings performed in Steps 301, 304, 305, 306, and 307 of FIG. 7 are substantially identical to those performed in Steps 201, 204, 205, 206, and 207 of FIG. 5, their descriptions will not be repeated.

In the present embodiment, as in the above-described embodiment, the quantity of air leaking from the pneumatic circuit to the atmosphere (the average leaked air quantity per unit time Qo* in a single cycle) can be calculated without use of air pressure within the pneumatic circuit which changes depending on travel conditions of a vehicle and other factors (without use of a pressure sensor). Further, it is possible to unerringly determine an anomaly of air leakage at the pneumatic circuit on the basis of the average leaked air quantity Qo* and inform the driver of the state (normal/anomalous) of air leakage from the pneumatic circuit through display at the instrument panel display section ID.

The above-described embodiments are configured to display the results of the determination in Step 204 (304) on the instrument panel display section ID to thereby inform a driver of the results of the determinations. However, the embodiments may be modified to inform the driver of the results of the determination in Step 204 (304) by means of an annunciating sound from a speaker.

In the above-described embodiments, the prohibition-state retention time (tdown) is shown to be about 2.5 times the permission-state retention time (tup) in FIG. 6. This shows a state in which air leaks from the pneumatic circuit, including the tire air chamber Rb (Air Leakage: Anomalous), and when no air leaks from the pneumatic circuit (Air Leakage: Normal), the prohibition-state retention time (tdown) becomes very long as compared with the permission-state retention time (tup). Further, in the above-described embodiments, the present invention is applied to a tire-pressure control apparatus not equipped with a pressure sensor. However, the present invention can be applied to a tire-pressure control apparatus equipped with a pressure sensor so as to serve as a backup when the pressure sensor experiences failure.

The invention claimed is:

1. A tire-pressure control apparatus comprising:
an air pump which is driven by a rotating wheel so as to supply compressed air to a tire air chamber of the wheel;
a mechanical control valve device disposed in an air passageway extending between the air pump and the tire air chamber and adapted to control a tire pressure within the tire air chamber, the control valve device being in a permission state where the control valve device permits supply of compressed air from the air pump to the tire air chamber during a period over which the tire pressure increases to an upper limit set value from a lower limit set value after having decreased to the lower limit set value, and being in a prohibition state where the control valve device prohibits supply of compressed air from the air pump to the tire air chamber during a period over which the tire pressure decreases to the lower limit set value from the upper limit set value after having increased to the upper limit set value;
a valve state detection sensor for detecting whether the control valve device is in the permission state or the prohibition state;
time measurement means for measuring a prohibition-state retention time, which is a time period starting when the control valve device enters the prohibition state and ending when the control valve device enters the permission state and a permission-state retention time, which is a time period starting when the control valve device enters the permission state and ending when the control valve device enters the prohibition state;
a wheel speed sensor for detecting rotational speed of the wheel;
total-discharged-air-quantity calculation means for calculating a total discharged air quantity, which is a total quantity of compressed air supplied from the air pump to the tire air chamber during the permission-state retention time, from a previously obtained quantity of compressed air discharged from the air pump per single revolution thereof and the rotational speed of the wheel which the wheel speed sensor detects during the permission-state retention time measured by the time measurement means; and
average-leaked-air-quantity calculation means for calculating an average leaked air quantity per unit time in a single cycle starting when the control valve device enters the prohibition state and ending when the control valve device again enters the prohibition state after entering the permission state or a single cycle starting when the control valve device enters the permission state and ending when the control valve device again enters the permission state after entering the prohibition state, from the prohibition-state retention time and the permission-state retention time measured by the time measurement means and the total discharged air quantity calculated by the total-discharged-air-quantity calculation means.

2. A tire-pressure control apparatus comprising:
an air pump which is driven by a rotating wheel so as to supply compressed air to a tire air chamber of the wheel;
a mechanical control valve device disposed in an air passageway extending between the air pump and the tire air chamber and adapted to control a tire pressure within the tire air chamber, the control valve device being in a permission state where the control valve device permits supply of compressed air from the air pump to the tire air chamber during a period over which the tire pressure increases to an upper limit set value from a lower limit set value after having decreased to the lower limit set value, and being in a prohibition state where the control valve device prohibits supply of compressed air from the air pump to the tire air chamber during a period over which the tire pressure decreases to the lower limit set value from the upper limit set value after having increased to the upper limit set value;
a valve state detection sensor for detecting whether the control valve device is in the permission state or the prohibition state;
time measurement means for measuring a prohibition-state retention time, which is a time period starting when the control valve device enters the prohibition state and ending when the control valve device enters the permission state and a permission-state retention time, which is a time period starting when the control valve device enters the permission state and ending when the control valve device enters the prohibition state;
a wheel speed sensor for detecting rotational speed of the wheel;
average-discharged-air-quantity calculation means for calculating an average discharged air quantity, which is a quantity of compressed air supplied from the air pump to the tire air chamber per unit time during the permission-state retention time, from a previously obtained quantity of compressed air discharged from the air pump per single revolution thereof and the rotational speed of the wheel which the wheel speed sensor detects during the permission-state retention time measured by the time measurement means; and average-leaked-air-quantity calculation means for calculating an average leaked air quantity per unit time from the average discharged air quantity calculated by the average-discharged-air-quantity calculation means and a ratio of the permission-state retention time to a time of a single cycle starting when the control valve device enters the prohibition state and ending when the control valve device again enters the prohibition state after entering the permission state or a single cycle starting when the control valve device enters the permission state and ending when the control valve device again enters the permission state after entering the prohibition state.

3. A tire-pressure control apparatus according to claim 1, further comprising:

leakage-quantity determination means for determining whether or not the average leaked air quantity is greater than a set value; and reporting means for reporting results of determination by the leakage-quantity determination means.

4. A tire-pressure control apparatus according to claim 2, further comprising:

leakage-quantity determination means for determining whether or not the average leaked air quantity is greater than a set value; and reporting means for reporting results of determination by the leakage-quantity determination means.

* * * * *